United States Patent [19]

Mrotzek

[11] 4,170,430
[45] Oct. 9, 1979

[54] FASTENING DEVICE

[76] Inventor: Richard Mrotzek, 19575 - 88th Ave., Surrey, B.C., Canada

[21] Appl. No.: 930,550

[22] Filed: Aug. 2, 1978

[51] Int. Cl.$^2$ ............................................. E04C 1/06
[52] U.S. Cl. ..................................... 403/20; 403/292; 402/316; 403/329
[58] Field of Search ............... 403/292, 293, 329, 322, 403/316, 20, 19, 6; 52/127, 585, 309.2, 511, 701, 704

[56] References Cited

U.S. PATENT DOCUMENTS

| | | | |
|---|---|---|---|
| 3,276,172 | 10/1966 | Alvden | 52/585 X |
| 3,339,954 | 9/1967 | Alvden | 403/322 |
| 3,567,260 | 3/1971 | Norris | 52/127 |
| 3,760,547 | 9/1973 | Brenneman | 403/292 X |
| 4,098,555 | 7/1978 | Vollenweider | 403/20 |

*Primary Examiner*—Andrew V. Kundrat
*Attorney, Agent, or Firm*—Carver and Company

[57] ABSTRACT

A device for fastening a pair of structural pieces in face to face relationship which has a pair of conical socket members adapted to be secured to each of the pieces and opening out of respective faces thereof for rotatably accepting opposite end portions of a dowel which has a pair of diametrically opposed longitudinally extending flat portions terminating in abutment faces which are engaged by free ends of a spring leaf detent outer ends of which are secured to the socket members near the open ends thereof, the dowel having a notched central flange which can be gripped by a tool extended between the pieces for rotating the dowel so as to move the abutment faces out of and into registration with the detents.

10 Claims, 8 Drawing Figures

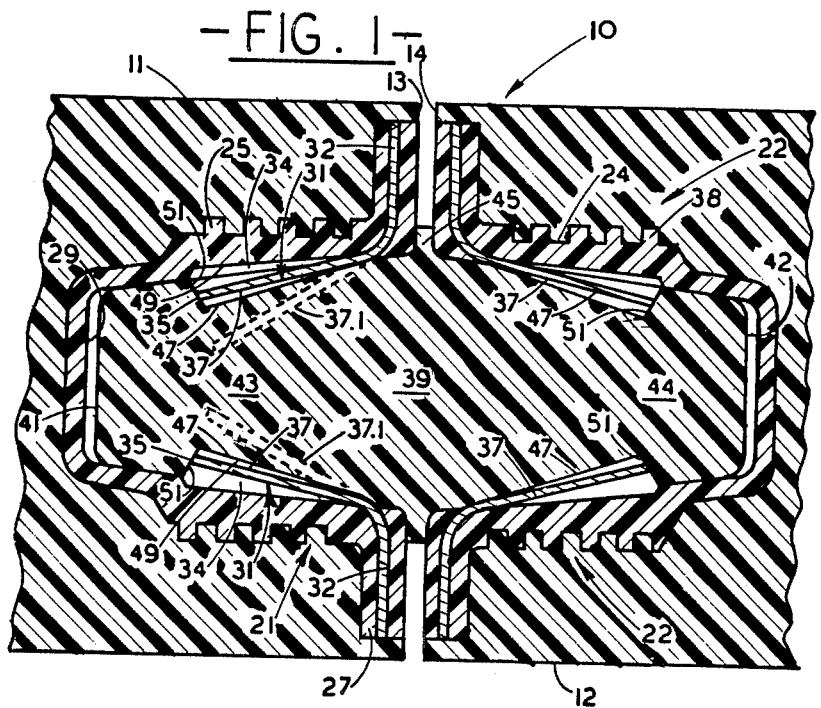
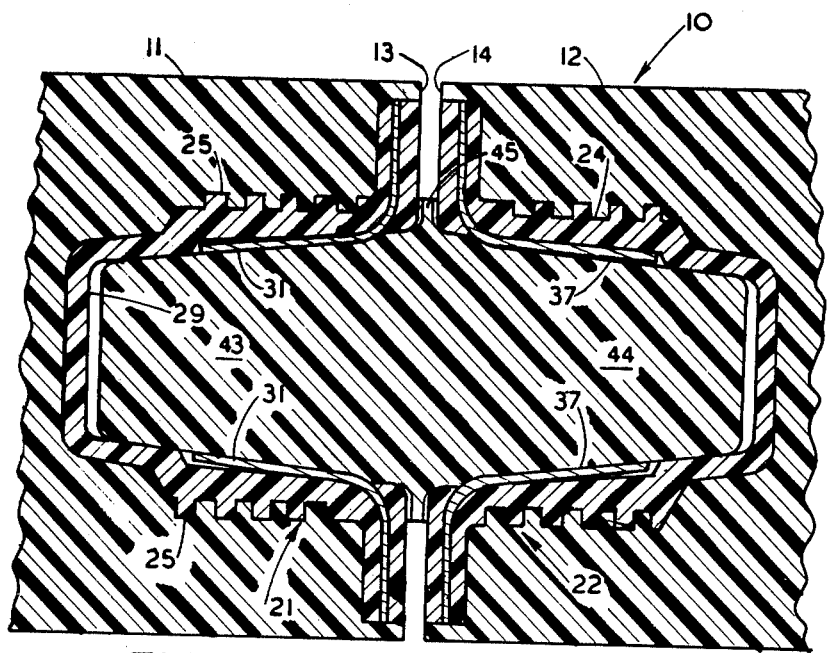

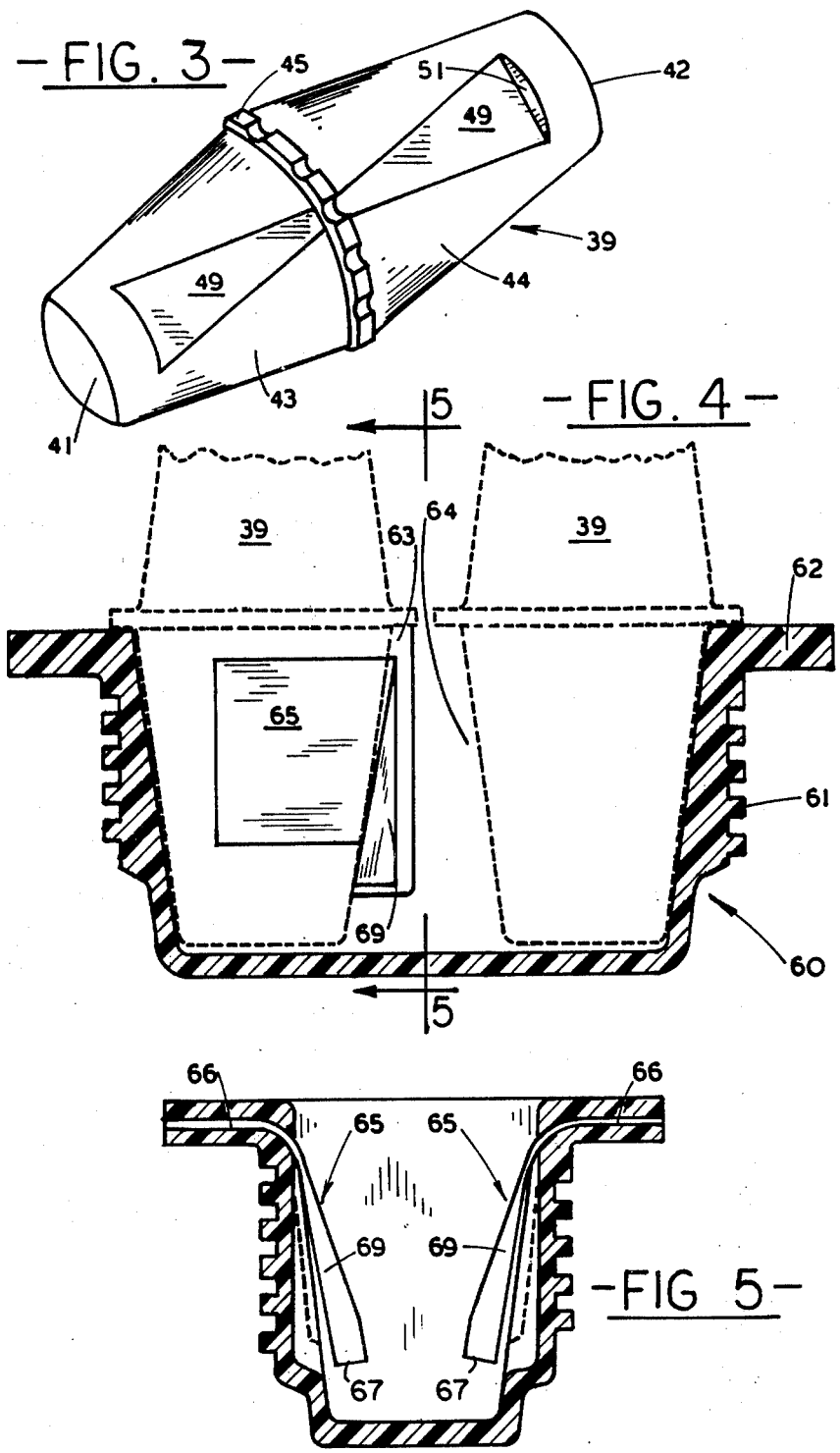

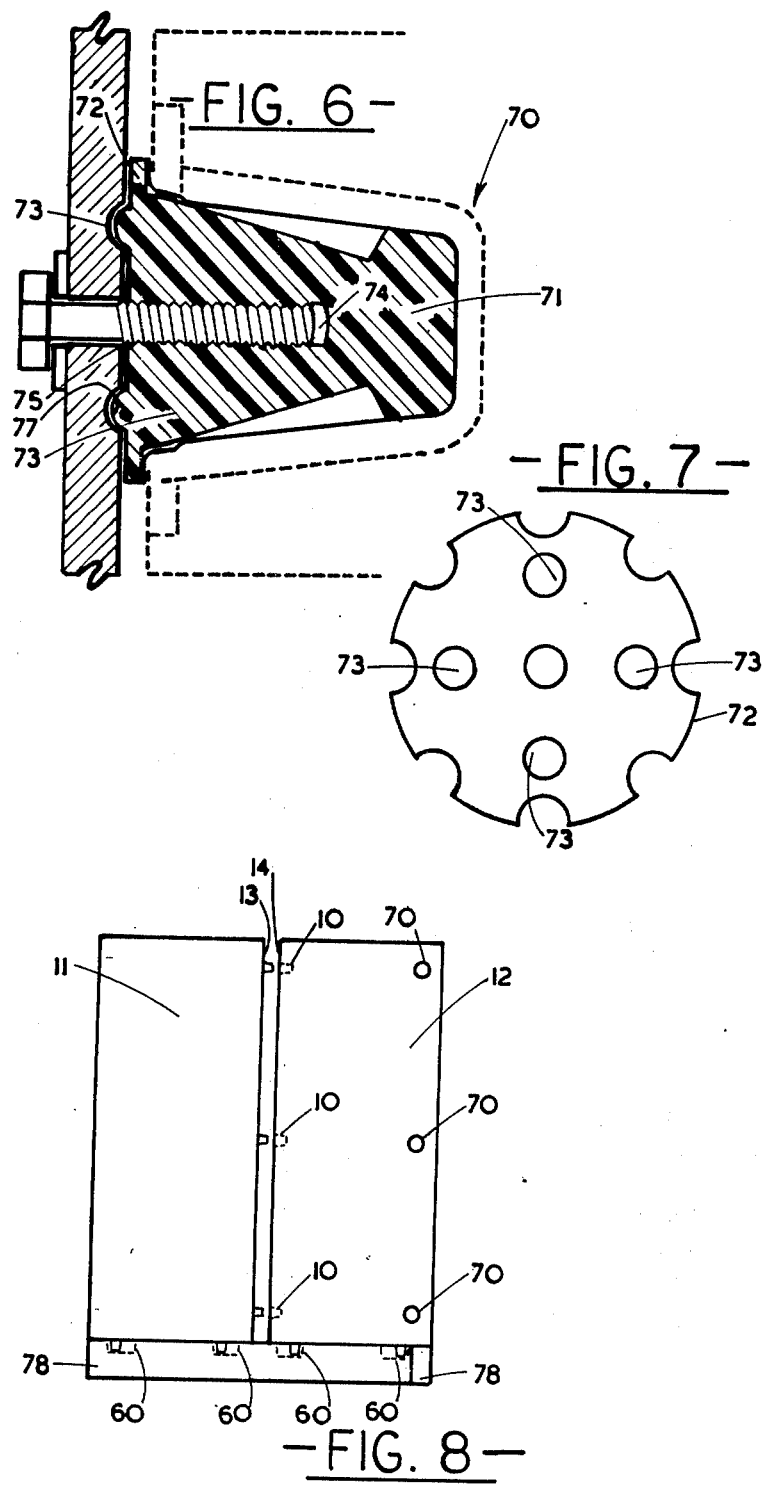

FASTENING DEVICE

BACKGROUND OF THE INVENTION

1. Field of the Invention

This invention relates to devices for connecting structural pieces of a disassemblable or permanent structure and in particular, but not limited to, devices for connecting wall panels and the like of disassemblable or permanent buildings.

2. Prior Art

In the erection of disassemblable of permanent structures such as buildings and the like, the various panels of the buildings have usually been interconnected by fasteners which are either visible or which require the various panels to be recessed to accept the fasteners and then the recesses covered by grouting, etc. Furthermore, prior art fasteners of this type have usually been difficult and time consuming to install and usually require, for their installation, the use of expert personnel.

Many fastening devices are prone to becoming loosened due to working of the interconnected pieces. This is particularly noticeable in buildings and the like which are subject to movement of interconnected panels and the like under gusty, windy conditions, the structure thus becoming unsafe and noisy.

SUMMARY OF THE INVENTION

The present invention provides a fastener for connecting disassemblable structures which is relatively inexpensive to manufacture, which can be easily installed in structural pieces to be connected and which, due to its simplicity of operation without the use of special tools enables buildings and the like to be erected by inexperienced personnel.

The fastener of the present invention is also self-aligning and is self-tightening once installed so as to reduce the tendency of the interconnected pieces to separate and thus loosen when subjected to conditions of use in which such pieces normally work relative to each other.

The fastening device of the present invention comprises a socket member adapted to be inset in one of the pieces to be connected having at least one detent secured interiorly thereof and being spring urged from a retracted position against the socket member wall to a radially extended position spaced from the wall and a dowel adapted for rotatable connection to another of the pieces having a rotatable, slidable fit in the socket, the dowel having a recessed portion terminating in a transverse abutement face for enabling the detent, when the dowel is fully inserted into the socket member, to move to a locking position confronting and engaging the abutement face, the dowel having a gripable means engageable by a tool inserted between the interconnected pieces for rotating the dowel to a position in which the abutement face is clear of the detent.

A detailed disclosure following, related to the drawings, describes a preferred embodiment of the invention which is capable of expression in structure other than that particularly described and illustrated.

DESCRIPTION OF THE DRAWINGS

FIGS. 1 and 2 are longitudinal sectional views of one embodiment of the invention arranged in locked and released positions respectively, FIG. 3 is a perspective view of a dowel, FIG. 4 are longitudinal and transverse sectional views respectively of a socket member of another embodiment of the invention, FIG. 5 is a view taken on line 5—5 of FIG. 4, FIG. 6 is a longitudinal sectional view of a dowel of yet another embodiment of the invention, FIG. 7 is an end view of the dowel as shown in FIG. 6, FIG. 8 shows, in elevation, a portion of a building structure partially disassembled with fasteners of the present invention installed therein.

DETAILED DISCLOSURE

Referring to the drawings, FIGS. 1 and 2 show one embodiment 10 of the fastener of the invention connecting a pair of aligned wall panels 11 and 12 of a building. The wall panels, as shown for the purpose of this application, are made of a suitable synthetic material, for example a foam thermoplastic sandwiched between fiberglass layers and are relatively thick so as to provide relatively wide end faces 13 and 14 extending in planar parallelism when the panels are disposed in end to end relationship.

The fastener 10 has a pair of identical socket members 21 and 22 which can be formed of a suitable thermoplastic material and which are installed in the wall panels when the latter are being molded. The socket member 21 has an outer cylindrical surface 24 provided with annular ribs 25 which enhance the grip of the socket member when the latter is incorporated in the molded wall panel 11 and has an exterior peripheral flange 27 at its open end which, as shown, is inset in the end face 13. The interior or socket proper of the socket member is frusto-conical, tapering from its open end to a flat bottom 29. The socket member 21 is also provided with a pair of detents 31—31 which are in the form of elongated flat thin springy material, such as spring steel, having fixed end portions 32—32 imbedded in the flange 27 and free end portions 33—33 which normally assume in normal extended position, shown by broken outline 37.1, and which can be moved to a retracted position, as shown in solid outline in FIG. 2, within recesses 34—34 formed in the inner wall of the socket member 21. As shown, the detents are disposed in diametrically opposed relationship and have free ends 35—35 which terminate short of the bottom 29 of the socket.

The socket member 22 is identical to the socket member 21 having detents 37—37 which correspond to the detents 31 and ribs 38—38 which correspond to the ribs 25.

The fastener 10 also includes a dowel 39, see also FIG. 3, which is tapered from its middle point towards opposite ends 41 and 42 to provide a pair of identical frusto-conical portions 43 and 44, the dowel having a centrally located notched circumferential flange 45. The dowel portions 43 have a pair of diametrically opposed recess portions 47—47 providing longitudinally extending flats 49—49 terminating in sloped abutement faces 51—51.

Referring to FIGS. 1 and 2 which show the fastener in its locked and released positions respectively, the socket members are so positioned in their respective wall panels so that with the panels in position ready for assembly the socket members are axially aligned and the detents 31—31 are in alignment with the detents 37—37.

With the fastener in the locked position as shown in FIG. 1, that is with the dowel fully inserted into the socket members, the dowel flange 45 maintains the socket members and also the wall panels slightly separated by a distance sufficient to enable the insertion of a tool between the end faces of the wall panels. In the locked position also, the recess portions of the dowels enable the detents to move towards their extended position, the length of said recess portions and the slope of the abutement faces being such that ends of the detents meet the abutement faces at an obtuse angle at approximately their middle height. The tendency of the detents to move to their extended positions, maintains the detents ends in engagement with the abutement faces, the slope of said faces being such so as to provide sufficient frictional engagement between the detent ends and the abutement faces to overcome any tendency of the faces to act as camming faces and thereby spread the detents. It has been found that dowels formed of a material such as metal or a thermoplastic and having slightly roughened front faces that the locking quality as described above is obtainable if the obtuse angle between the detents and the abutement faces is less than 110 degrees.

In use of the fastener 10, the dowel is first inserted in the locked position in the socket member 21 and wall panel is suitably positioned for assembly. The wall panel 12 is then suitably positioned with respect to wall panel 11 with the socket member 22 aligned with the dowel and moved towards the wall panel 11 so that the dowel reaches a fully inserted position in the socket member 21 to enable the detents 37, which have been spread into the corresponding recess of the socket member 22 moved towards their extended position and thus interlock the panels. Due to the tendency of the detents to move to their extended position, the ends thereof will always be in contact with the corresponding abutement faces of the dowel and thus, if there should be any slight movements of the dowel relative to the socket member due to working of the panels actually has a tightening effect and thus reduce any tendency of the fastener components to become loose due to working of the panels which may occur under windy conditions.

The fastener can easily be disconnected by simply inserting a tool of sufficient size, such as a thin screw driver or perhaps a specially designed wrench, between the end faces of the panels to engage the notched flange 45 and the dowel rotated approximately 90 degrees about its longitudinal axis to move the abutement faces out of alignment with the detents, thus moving the detents radially outward into the respective wall recesses of the socket members to a release position, as shown in FIG. 2, thus enabling the panels to be separated.

It is understood that the fastener as above described is suitable for use with wall panels or other structural pieces which are formed of a moldable material in which the socket members may be incorporated during molding. It is to be understood, however, that the socket members substantially as described above can be used for joining structural pieces made of other than moldable material for example wood in which case said structural pieces would be provided with tapped bores to accept the socket members and the socket members rather than having exterior ribs are previously described can be suitably threaded to provide a desired connection with threaded bores.

FIGS. 4 and 5 show another form of socket member 60. The socket member 60 has, like socket members 21 and 22, a cylindrical outer surface provided with ribs 61 and a peripheral flange 62 at its open end. Socket member 60, however, differs from socket members 21 and 22 in that is is elongated in one direction to provide a socket 63 proper and a lateral extension 64 which enables the dowel 39, shown in broken outline in two positions, to be moved laterally while fully inserted between the socket proper and the extension, amplitude of movement being equal to one-half the length of the dowel. The socket member 60 also has spring leaf detents 65—65, one end portion 66—66 each of which is imbedded in the peripheral flange 62 and the other end 67—67 which assumes a normal extended position, as shown in solid outline, and which can be moved back into recesses of the socket walls. The detents 65 also have camming wing portions 69—69 which spread the detents apart when engaged by the dowel as the latter moves from the lateral extension into the socket proper, and also which serves to releasably lock the dowel against lateral movement when the dowel is in the locked position between the detents.

FIGS. 6 and 7 show another form of dowel 70 for use where thickness of a wall panel is insufficient to enable placement of the socket members hereinbefore described. The dowel 70 has, unlike the double ended dowel 39, a single frusto-conical portion 71 recessed in the manner of dowel 39 having a notched peripheral flange 72 forming a base which, as shown in FIGS. 6 and 7, is provided with a plurality of semi-circular detents 73. The dowel 71 which has a tapped axial bore 74 is secured to the wall panel 75 by a bolt which extends into the tapped bore. The wall panel has depressions 77 which are arranged in a pattern conforming to the raised detents 73 so that the dowel 71 can be suitably positioned and secured against rotation.

FIG. 8 shows a pair of wall panels 11 and 12 in partially assembled relationship on a floor structure 78. Fasteners 10 are used for joining abuting end faces 13 and 14 of the panels and socket 60 have been inset in the floor 78. This enables the panel 11 to be secured to the floor and then the panel 12 positioned with the dowels in the lateral extension of the sockets 60 and then slid laterally to join the panels 11 and 12. The dowels 70 are positioned on the face of the panel 12 adjacent its outer edge for connection to a socket member, as described with reference to socket members 21 and 22, which are installed in a wall panel, not shown, to be disposed normal to the panel 12.

I claim:

1. A fastener for connecting a pair of structural pieces comprising:
   (a) at least one socket member adapted to be inset in one of the pieces;
   (b) yieldably resilient detent means mounted in the socket member for radial movement between a normal inwardly extended position and an outwardly retracted position,
   (c) a dowel having a slidable, rotatable fit in the socket member,
   (d) means for connecting the dowel to the other of the pieces for rotation,
   (e) the dowel having a recessed portion providing an abutement face for enabling the detent means, when aligned with the said recess portion, to move towards the extended position in the path of and engaging the abutement face so as to releasably lock the dowel in the socket member,
   (f) gripable means on the dowel adapted to be gripped by a tool inserted between the pieces for rotating the dowel to a release position in which the abutement face is positioned out of alignment with the detent means for enabling the dowel to be withdrawn from the socket member.

2. A fastener as claimed in claim 1 in which the detent means comprises a strip or springy material imbedded at one end in the socket member adjacent an open end of the latter and having a free end portion extending inwardly from the open end of the socket and the abutement face is sloped so as to extend at an obtuse angle to said free end portion of said detent member.

3. A fastener as claimed in claim 1 or 2 including exteriorly extending peripheral flange of the dowel engageable with an open end portion of the socket for limiting depth of insertion of the dowel in the socket, said peripheral flange being notched to provide said gripable means for engagement with the tool insertable between the pieces.

4. A fastener as claimed in claim 1 in which the socket member is elongated laterally for enabling lateral movement of the dowel while the latter is fully inserted in the socket member.

5. A fastener as claimed in claim 1 in which both the dowel and socket member are frusto-conical.

6. A fastener for connecting a pair of structural pieces comprising:
 (a) a pair of socket members adapted to be inset in each of the pieces,
 (b) a pair of yieldably resilient detent means mounted in diametric opposition in each of the socket members for radial movement between normally inwardly extending positions and outwardly retracting positions,
 (c) the socket members being adapted to be rotatably positioned so that the detents of one socket member are aligned with the detents of the other socket member,
 (d) a dowel having a slidable rotatable fit in the socket members,
 (e) the dowel having diametrically opposed recessed portions adjacent each end of the dowel, each of said recess portions providing an abutement face for enabling the detent means, when aligned with said recess portions, to move towards their extended positions in the path of and engaging the abutement faces so as to releasably lock the dowel in the socket members,
 (f) gripable means on the dowel adapted to be gripped by a tool inserted between the pieces for rotating the dowel to a release position in which the abutement faces are positioned out of alignment with the detent means for enabling the dowel to be withdrawn from the socket members.

7. A fastener as claimed in claim 6 in which each of the detent means comprises a strip of springy material imbedded at one end in its associated socket member adjacent an open end of the latter and having a free end portion extending inwardly from the open end of the associated socket member and each of the abutement faces is sloped so as to extend at an obtuse angle to said free end portions of the the detent members.

8. A fastener as claimed in claims 6 or 7 including an exteriorly extending peripheral flange substantially centrally of the dowel engageable with an open end of each the socket members for limiting depth of insertion of the dowel in the socket members, said peripheral flange being notched to provide said gripable means for engagement with the tool insertable between the pieces.

9. A fastener as claimed in claim 6 in which the socket members are frusto-conical and in which the dowel tapers towards its ends.

10. A fastener as claimed in claim 1 in which one of the socket members is elongated laterally for enabling lateral movement of the dowel when the latter is fully inserted in said one socket member.

* * * * *